US012490774B2

(12) United States Patent
Reevell

(10) Patent No.: US 12,490,774 B2
(45) Date of Patent: *Dec. 9, 2025

(54) E-VAPING ELEMENT WITH FIRST TEMPERATURE SENSOR SPACED APART FROM HEATER

(71) Applicant: Altria Client Services LLC, Richmond, VA (US)

(72) Inventor: Tony Reevell, London (GB)

(73) Assignee: Altria Client Services LLC, Richmond, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/432,685

(22) Filed: Feb. 5, 2024

(65) Prior Publication Data

US 2024/0179806 A1    May 30, 2024

Related U.S. Application Data

(60) Division of application No. 17/186,808, filed on Feb. 26, 2021, now Pat. No. 11,917,731, which is a
(Continued)

(30) Foreign Application Priority Data

Feb. 25, 2016    (EP) .................... 16157437

(51) Int. Cl.
*A24F 40/53*    (2020.01)
*A24F 40/10*    (2020.01)
(Continued)

(52) U.S. Cl.
CPC ............. *A24F 40/53* (2020.01); *A24F 40/51* (2020.01); *H05B 1/0244* (2013.01); *H05B 3/04* (2013.01);
(Continued)

(58) Field of Classification Search
CPC ...... A24F 47/00; A24F 47/004; A24F 47/008; H05B 1/0244; H05B 2203/021
(Continued)

(56) References Cited

U.S. PATENT DOCUMENTS 9,247,773 B2    2/2016    Memari et al.
2007/0214881 A1    9/2007    Shu et al.
(Continued)

FOREIGN PATENT DOCUMENTS

CN    1330563 A    1/2002
CN    103338664 A    10/2013
(Continued)

OTHER PUBLICATIONS

Korean Office Action, dated Jun. 21, 2024, issued in Korean Patent Application No. 10-2018-7022131.
(Continued)

*Primary Examiner* — Steven W Crabb
*Assistant Examiner* — Alba T Rosario-Aponte
(74) *Attorney, Agent, or Firm* — Harness, Dickey & Pierce, P.L.C.

(57) ABSTRACT

The e-vaping element includes a reservoir configured to hold a liquid aerosol-forming substrate, a heater configured to receive the liquid aerosol-forming substrate from the reservoir, one or more capillary wicks configured to transfer the liquid aerosol-forming substrate from the reservoir to the heater, and a first temperature sensor configured to sense at least one first temperature of the liquid aerosol-forming substrate held in the reservoir, the first temperature sensor and the heater being spaced apart from each other and being on opposite ends of the reservoir.

21 Claims, 1 Drawing Sheet

Related U.S. Application Data division of application No. 15/441,833, filed on Feb. 24, 2017, now Pat. No. 10,932,495, which is a continuation of application No. PCT/EP2017/053688, filed on Feb. 17, 2017.

(51) Int. Cl.
*A24F 40/51* (2020.01)
*H05B 1/02* (2006.01)
*H05B 3/04* (2006.01)
*H05B 3/44* (2006.01)

(52) U.S. Cl.
CPC ............... *H05B 3/44* (2013.01); *A24F 40/10* (2020.01); *H05B 2203/014* (2013.01); *H05B 2203/021* (2013.01); *H05B 2203/022* (2013.01)

(58) Field of Classification Search
USPC ................................................ 392/394, 395
See application file for complete search history.

(56) References Cited

U.S. PATENT DOCUMENTS

| | | | |
|---|---|---|---|
| 2011/0036346 A1 | 2/2011 | Cohen et al. | |
| 2012/0291791 A1 | 11/2012 | Pradeep | |
| 2013/0104916 A1 | 5/2013 | Bellinger et al. | |
| 2013/0297235 A1 | 11/2013 | Oldfield et al. | |
| 2013/0298905 A1 | 11/2013 | Levin et al. | |
| 2013/0336358 A1 | 12/2013 | Liu | |
| 2014/0020693 A1* | 1/2014 | Cochand | A61M 11/041 131/273 |
| 2014/0229137 A1 | 8/2014 | Rusnack et al. | |
| 2014/0305450 A1 | 10/2014 | Xiang | |
| 2014/0338685 A1* | 11/2014 | Amir | H05B 1/0244 131/329 |
| 2015/0245654 A1 | 9/2015 | Memari et al. | |
| 2015/0305409 A1 | 10/2015 | Verleur et al. | |
| 2015/0313275 A1 | 11/2015 | Anderson et al. | |
| 2016/0007653 A1* | 1/2016 | Tu | F22B 1/284 29/890.07 |
| 2016/0198767 A1* | 7/2016 | Verleur | A24F 40/40 392/386 |
| 2017/0099878 A1* | 4/2017 | Murison | A24F 15/015 |

FOREIGN PATENT DOCUMENTS

| | | |
|---|---|---|
| CN | 103338665 A | 10/2013 |
| CN | 104010530 A | 8/2014 |
| EP | 2257195 B1 | 6/2012 |
| EP | 2468117 A1 | 6/2012 |
| EP | 2468118 A1 | 6/2012 |
| EP | 2609820 A1 | 7/2013 |
| EP | 2471392 B1 | 9/2013 |
| GB | 2507102 A | 4/2014 |
| JP | 2014-501105 A | 1/2014 |
| JP | 2015-524257 A | 8/2015 |
| KR | 200461404 Y1 | 7/2012 |
| KR | 10-20160129024 A | 11/2016 |
| WO | WO-2008077271 A1 | 7/2008 |
| WO | WO-2009118085 A1 | 10/2009 |
| WO | WO-2009127401 A1 | 10/2009 |
| WO | WO-2011137453 A2 | 11/2011 |
| WO | WO-2011146329 A2 | 11/2011 |
| WO | WO-2012027350 A2 | 3/2012 |
| WO | WO-201272790 A1 | 6/2012 |
| WO | WO-2012085203 A1 | 6/2012 |
| WO | WO-2012085205 A1 | 6/2012 |
| WO | WO-2012085207 A1 | 6/2012 |
| WO | WO-2013060781 A1 | 5/2013 |
| WO | WO-2013060784 A2 | 5/2013 |
| WO | WO-2013098398 A2 | 7/2013 |
| WO | WO-2014040988 A2 | 3/2014 |
| WO | WO-2014138244 A1 | 9/2014 |
| WO | WO-2014150247 A1 | 9/2014 |
| WO | WO-2014166037 A1 | 10/2014 |
| WO | WO-2014166121 A1 | 10/2014 |
| WO | WO-2015026948 A1 | 2/2015 |
| WO | WO-2015073854 A2 | 5/2015 |
| WO | WO-2015/117700 A1 | 8/2015 |

OTHER PUBLICATIONS

Notice of Allowance, dated Jul. 3, 2024, issued in U.S. Appl. No. 17/738,120.
Search Report in corresponding European patent application 16157437.1, dated Jul. 13, 2016.
International Search Report and Written Opinion dated Mar. 24, 2017.
Notice of Allowance and Search Report dated Mar. 17, 2020, issued in corresponding Russian Application No. 2018133598.
Office Action dated Sep. 9, 2020, issued in corresponding Chinese Patent Application No. 201780005653.0.
Search Report from corresponding European patent application 16157434.8, dated Jul. 18, 2016.
International Search Report and Written Opinion for Application No. PCT/EP2017/053707 dated May 9, 2017.
Decision to Grant and Search Report issued Mar. 11, 2020 in Russian Application No. 2018130570/12(049662).
First Office Action issued Oct. 28, 2020 in Chinese Application No. 201780009143.0.
Office Action dated Mar. 8, 2021, issued in corresponding Japanese Patent Application No. 2018-544876.
Office Action issued May 21, 2021 in Chinese Application No. 201780009143.0.
Office Action dated Sep. 15, 2021, issued in corresponding Japanese Patent Application No. 2018-544876.
U.S. Office Action dated May 16, 2019, issued in corresponding U.S. Appl. No. 15/441,813.
U.S. Office Action dated Sep. 16, 2019, issued in corresponding U.S. Appl. No. 15/441,813.
U.S. Office Action dated Feb. 6, 2020, issued in corresponding U.S. Appl. No. 15/441,813.
U.S. Office Action dated Aug. 7, 2020, issued in corresponding U.S. Appl. No. 15/441,813.
U.S. Office Action dated Jun. 21, 2021, issued in corresponding U.S. Appl. No. 15/441,813.
U.S. Notice of Allowance dated Oct. 19, 2021, issued in corresponding U.S. Appl. No. 15/441,813.
U.S. Office Action dated May 16, 2019, issued in corresponding U.S. Appl. No. 15/441,833.
U.S. Office Action dated Oct. 18, 2019, issued in corresponding U.S. Appl. No. 15/441,833.
U.S. Office Action dated Mar. 27, 2020, issued in corresponding U.S. Appl. No. 15/441,833.
U.S. Notice of Allowance dated Oct. 30, 2020, issued in corresponding U.S. Appl. No. 15/441,833.
Office Action issued Nov. 2, 2021 in Chinese Application No. 201780009143.0.
U.S. Notice of Allowance dated Jan. 14, 2022, issued in corresponding U.S. Appl. No. 15/441,813.
Decision to Grant dated Jan. 17, 2022, issued in corresponding Japanese Patent Application No. 2018-544876.
Notice of Allowance dated Mar. 3, 2022 issued in corresponding Chinese patent application No. 201780009143.0.
Office Action dated Feb. 3, 2023, issued in corresponding U.S. Appl. No. 17/738,120.
Office Action dated Mar. 17, 2023, issued in corresponding U.S. Appl. No. 17/186,808.
Office Action dated Aug. 4, 2023, issued in corresponding U.S. Appl. No. 17/186,808.
Office Action dated Sep. 12, 2023, issued in corresponding U.S. Appl. No. 17/738,120.
Notice of Allowance, dated Oct. 31, 2023, issued in U.S. Appl. No. 17/186,808.
Notice of Allowance, dated Mar. 22, 2024, issued in U.S. Appl. No. 17/738,120.

(56) References Cited

OTHER PUBLICATIONS

Korean Office Action, dated May 6, 2024, issued in Korean Patent Application No. 10-2018-7019545.
Korean Office Action, dated Aug. 1, 2024, issued in Korean Patent Application No. 10-2018-7019545.
Korean Office Action, dated Nov. 11, 2024, issued in Korean Patent Application No. 10-2018-7019545.
Korean Notice of Allowance, dated Dec. 19, 2024, issued in Korean Patent Application No. 10-2018-7022131.

* cited by examiner

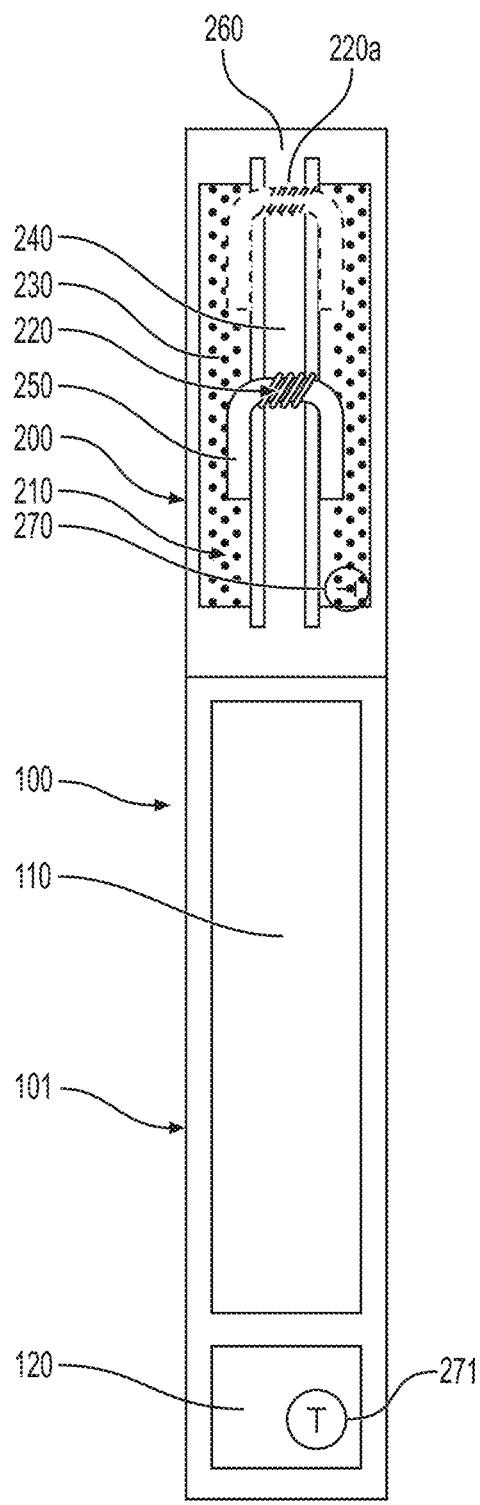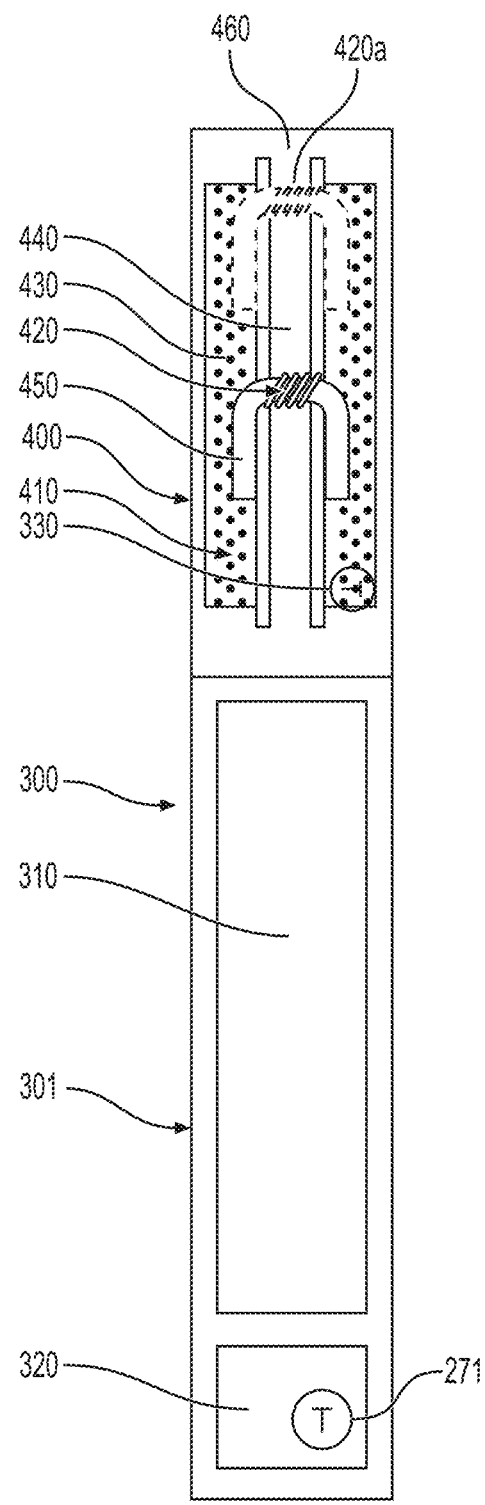
*FIG. 1*  *FIG. 2*

E-VAPING ELEMENT WITH FIRST TEMPERATURE SENSOR SPACED APART FROM HEATER

CROSS-REFERENCE TO RELATED APPLICATIONS

This application is a divisional of U.S. application Ser. No. 17/186,808, filed Feb. 26, 2021, which is a divisional of U.S. application Ser. No. 15/441,833, filed Feb. 24, 2017, which is a continuation of, and claims priority to, International Application No. PCT/EP2017/053688, filed on Feb. 17, 2017, and further claims priority under 35 U.S.C. § 119 to European Patent Application No. 16157437.1, filed Feb. 25, 2016, the entire contents of each of which are incorporated herein by reference.

BACKGROUND

Some example embodiments relate to an electrically operated aerosol-generating system.

Electrically operated aerosol-generating systems that atomise a liquid substrate typically comprise a device portion, comprising a battery and control electronics, and a cartridge portion, comprising a supply of aerosol-forming substrate and an electrically operated atomiser. A cartridge comprising both a supply of aerosol-forming substrate and an atomiser is sometimes referred to as a 'cartomiser'. The atomiser is typically a heater assembly. In some known examples, the aerosol-forming substrate is a liquid aerosol-forming substrate and the atomiser comprises a coil of heater wire wound around an elongate wick soaked in liquid aerosol-forming substrate. The cartridge portion typically also comprises a mouthpiece. Other arrangements of electrically operated aerosol-generating systems are also possible. For example, an aerosol-generating system may comprise three parts, a main unit comprising a battery and control electronics, a cartridge portion comprising a supply of aerosol-forming substrate, and an electrically operated atomiser portion comprising an atomiser. Both the cartridge portion and the atomiser portion may be disposable.

Electrically operated aerosol generating systems may be configured to perform other functions, such as providing an indication of the depletion of liquid aerosol-forming substrate and the amount of liquid aerosol-forming substrate remaining in the liquid storage portion. For example, WO2012085203A1 describes an electrically operated aerosol-generating system comprising electric circuitry configured to determine depletion of liquid aerosol-forming substrate based on a relationship between a power applied to a heating element and a resulting temperature change of the heating element. Determination of depletion is advantageous for a number of reasons. For example, when the liquid storage portion is empty or nearly empty, insufficient liquid aerosol-forming substrate may be supplied to the electric heater. This may mean that the generated aerosol does not have the desired properties, for example, aerosol particle size or chemical composition. This may result in a poor experience. In addition, if it can be determined when the liquid storage portion is empty or nearly empty, it may be possible to inform an operator, so that the operator can prepare to replace or refill the liquid storage portion.

It would be desirable for a determination of depletion of liquid aerosol-forming substrate by an electrically operated aerosol-generating system to be as accurate as possible.

SUMMARY

At least one embodiment relates to an electrically operated aerosol-generating system for receiving a liquid aerosol-forming substrate.

In one embodiment, the aerosol-generating system includes a liquid storage portion configured to hold a liquid aerosol-forming substrate; an aerosol generator configured to receive liquid aerosol-forming substrate from the liquid storage portion; one or more capillary wicks configured to transfer liquid aerosol-forming substrate from the liquid storage portion to the aerosol generator; a first temperature sensor configured to sense the temperature of liquid aerosol-forming substrate held in the liquid storage portion; and electric circuitry configured to monitor the temperature of the liquid aerosol-forming substrate held in the liquid storage portion as sensed by the first temperature sensor and determine depletion of liquid aerosol-forming substrate based on the temperature of the liquid aerosol-forming substrate.

Other embodiments relate to a cartridge of an aerosol-generating system, a main unit of an aerosol-generating system, or other elements of an aerosol-generating system.

BRIEF DESCRIPTION OF THE DRAWINGS

Embodiments will now be described in detail, by way of example only, with reference to the accompanying drawings, in which:

FIG. 1 is a schematic illustration of a first embodiment of an electrically operated aerosol-generating system; and FIG. 2 is a schematic illustration of a second embodiment of an electrically operated aerosol-generating system.

DETAILED DESCRIPTION

Example embodiments will become more readily understood by reference to the following detailed description of the accompanying drawings. Example embodiments may, however, be embodied in many different forms and should not be construed as being limited to the example embodiments set forth herein. Rather, these example embodiments are provided so that this disclosure will be thorough and complete. Like reference numerals refer to like elements throughout the specification.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises," "comprising," "includes," and/or "including," when used in this specification, specify the presence of stated features, integers, steps, operations, and/or elements, but do not preclude the presence or addition of one or more other features, integers, steps, operations, elements, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, regions, layers and/or sections, these elements, regions, layers and/or sections should not be limited by these terms. These terms are only used to distinguish one element, region, layer or section from another region, layer or section. Thus, a first element, region, layer or section discussed below could be termed a second element, region, layer or section without departing from the teachings set forth herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Some example embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these example embodiments should not be construed as limited to the particular shapes of regions illustrated herein, but are to include deviations in shapes that result, for example, from manufacturing.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

As disclosed herein, the term "storage medium", "computer readable storage medium" or "non-transitory computer readable storage medium," may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, at least some portions of example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, processor(s), processing circuit(s), or processing unit(s) may be programmed to perform the necessary tasks, thereby being transformed into special purpose processor(s) or computer(s).

When the terms "about" or "substantially" are used in this specification in connection with a numerical value, it is intended that the associated numerical value include a tolerance of ±10% around the stated numerical value. Moreover, when reference is made to percentages in this specification, it is intended that those percentages are based on weight, i.e., weight percentages. The expression "up to" includes amounts of zero to the expressed upper limit and all values there between. When ranges are specified, the range includes all values there between such as increments of 0.1%. Moreover, when the words "generally" and "substantially" are used in connection with geometric shapes, it is intended that precision of the geometric shape is not required but that latitude for the shape is within the scope of the disclosure. Although the tubular elements of the embodiments may be cylindrical, other tubular cross-sectional forms are contemplated, such as square, rectangular, oval, triangular and others.

In one embodiment, there is provided an electrically operated aerosol-generating system for receiving a liquid aerosol-forming substrate. The aerosol-generating system comprises a liquid storage portion for holding a liquid aerosol-forming substrate and an aerosol generator arranged to receive liquid aerosol-forming substrate from the liquid storage portion. One or more capillary wicks are arranged to transfer liquid aerosol-forming substrate from the liquid storage portion to the aerosol generator. A temperature sensor is arranged to sense the temperature of liquid aerosol-forming substrate held in the liquid storage portion. Electric circuitry is configured to monitor the temperature of the liquid aerosol-forming substrate held in the liquid storage portion as sensed by the temperature sensor and determine depletion of liquid aerosol-forming substrate based on the temperature of the liquid aerosol-forming substrate. The electric circuitry may include a processor and a memory, an application specific integrated circuit (ASIC), or combination thereof. The memory may be a nonvolatile memory, such as a flash memory, a phase-change random access memory (PRAM), a magneto-resistive RAM (MRAM), a resistive RAM (ReRAM), or a ferro-electric RAM (FRAM), or a volatile memory, such as a static RAM (SRAM), a dynamic RAM (DRAM), or a synchronous DRAM (SDRAM). The processor may be a central processing unit (CPU) or a controller that when executing instructions stored in the memory, configures the processor as a special purpose computer to perform the operations of the electric circuitry.

In use of the electrically operated aerosol-generating system, liquid aerosol-forming substrate is drawn through the one or more capillary wicks by capillary action. Liquid aerosol-forming substrate in the one or more capillary wicks is received at the aerosol generator. When the aerosol generator is activated, the liquid aerosol-forming substrate received at the aerosol generator is atomised by the aerosol generator and is drawn away from the liquid storage portion.

This depletes the amount of liquid aerosol-forming substrate held in the liquid storage portion.

During normal use, when sufficient liquid aerosol-forming substrate is held in the liquid storage portion, the capillary properties of the one or more capillary wicks and the properties of the liquid aerosol-forming substrate ensure that the one or more capillary wicks are regularly drawing liquid aerosol-forming substrate from the liquid storage portion to the aerosol generator. The rate at which the liquid aerosol-forming substrate is drawn along the one or more capillary wicks is known as the wicking rate, or the rate of imbibition. The wicking rate may be dependent on the properties of the liquid aerosol-forming substrate, such as the viscosity of the liquid aerosol-forming substrate. The viscosity of the liquid aerosol-forming substrate may be dependent on the temperature of the liquid aerosol-forming substrate. For example, the wicking rate of a cold liquid aerosol-forming substrate through the one or more capillary wicks may be lower than the wicking rate of a warm liquid aerosol-forming substrate through the one or more capillary wicks.

Depletion of liquid aerosol-forming substrate from the liquid storage portion may depend on the wicking rate of the liquid aerosol-forming substrate along the one or more capillary wicks. For example, in use, when the aerosol generator is activated, a warm liquid aerosol-forming substrate may be received at the aerosol generator at a faster rate than a cold liquid aerosol-forming substrate. This may result in a larger amount of warm liquid aerosol-forming substrate being atomised and depleted from the liquid storage portion during a period of activation of the aerosol generator than with a cold liquid aerosol-forming substrate. In other words, raising the temperature of the liquid aerosol-forming substrate held in the liquid storage portion may result in the aerosol-generating system delivering a greater amount of aerosol in a single puff. Therefore, variations in the temperature of the liquid aerosol-forming substrate held in the liquid storage portion may result in variations in the depletion of liquid aerosol-forming substrate from the liquid storage portion.

In one embodiment, the electric circuitry is configured to determine depletion of liquid aerosol-forming substrate from the liquid storage portion based on measurements of the temperature of the liquid aerosol-forming substrate held in the liquid storage portion. In other words, the electric circuitry is configured to compensate or adjust a determination of depletion of liquid aerosol-forming substrate from the liquid storage portion to account for variations in the temperature of the liquid aerosol-forming substrate held in the liquid storage portion. This temperature compensation or adjustment may improve the accuracy of the determination of depletion of liquid aerosol-forming substrate for the liquid storage portion. This may improve the experience. For example, a more accurate determination of depletion may enable the electric circuitry to indicate that the liquid storage portion requires replacement or refilling when the determined amount of liquid aerosol-forming substrate remaining is lower. This may reduce wastage of liquid aerosol-forming substrate and reduce the cost of using the aerosol-generating system.

As used herein, depletion or consumption of liquid aerosol-forming substrate from the liquid storage portion may refer to an amount of liquid aerosol-forming substrate that has been removed from the liquid storage portion. The determined amount of liquid aerosol-forming substrate depleted from the liquid storage portion may be an absolute amount or a relative amount, such as a percentage value. Depletion or consumption may also refer to a rate of depletion of liquid aerosol-forming substrate held in the liquid storage portion. A rate of depletion may comprise a reduction in the amount of liquid aerosol-forming substrate held in the liquid storage portion over a period of time.

The electric circuitry may also be configured to determine the amount of liquid aerosol-forming substrate remaining in the liquid storage portion based on the determined depletion. The electric circuitry may also be configured to determine the time remaining or the number of puffs remaining until the liquid aerosol-forming substrate held in the liquid storage portion is depleted or exhausted based on the determined depletion. The liquid aerosol-forming substrate may be considered to be depleted or exhausted from the liquid storage portion when the amount of liquid aerosol-forming substrate held in the liquid storage portion is reduced below a desired (or, alternatively a predetermined) threshold.

The temperature sensor may be any suitable type of temperature sensor for sensing the temperature of the liquid aerosol-forming substrate held in the liquid storage portion. Suitable types of temperature sensor include, amongst others, thermocouples, thermistors and resistive temperature sensors.

The temperature sensor may be arranged at any suitable location relative to the liquid storage portion for sensing the temperature of the liquid aerosol-forming substrate held in the liquid storage portion. For example, the temperature sensor and the aerosol generator may be arranged opposite to each other, where each is on one of opposite ends of the liquid storage portion. This may reduce or minimise the increase in temperature sensed by the temperature sensor due to activation of the aerosol generator. This may enable the temperature sensor to sense an average temperature of the liquid aerosol-forming substrate held in the liquid storage portion.

The temperature sensor may be arranged in the liquid storage portion. This may provide a particularly accurate measurement of the temperature of the liquid aerosol-forming substrate held in the liquid storage portion.

The temperature sensor may be arranged in contact with liquid aerosol-forming substrate held in the liquid storage portion. Where the temperature sensor arranged in the liquid storage portion, the temperature sensor may be coated with a fluid impermeable coating or surrounded by a fluid impermeable housing to protect the temperature sensor from contact with the liquid aerosol-forming substrate.

The temperature sensor may be arranged adjacent to the liquid storage portion. This may reduce the cost of the temperature sensor compared to a temperature sensor arranged inside the liquid storage portion, because a temperature sensor arranged adjacent to the liquid storage portion may not require additional protection from contact with the liquid aerosol-forming substrate.

The aerosol-generating system may comprise a plurality of removably couplable elements. For example, the aerosol-generating system may comprise a cartridge comprising the liquid storage portion and a main unit comprising the electric circuitry. The temperature sensor may be arranged in any of the removably couplable elements. The temperature sensor may be arranged in the main unit or in the cartridge. The main unit may be configured for multiple uses. The cartridge may be configured for a single use and may be disposable. It may be advantageous to arrange the temperature sensor in the main unit, such that the temperature sensor is not disposed of with the cartridge after a single use of the aerosol-generating system. This may reduce the cost of the cartridges.

The electric circuitry may comprise any suitable elements. The electric circuitry may comprise a microprocessor. The microprocessor may be a programmable microprocessor.

The electric circuitry may comprise a memory. The memory may store a lookup table. The lookup table may comprise stored reference temperature information. The lookup table may comprise stored liquid aerosol-forming substrate depletion information. The stored depletion information may comprise information relating to the amount of liquid aerosol-forming substrate depleted from the liquid storage portion or may comprise information relating to the rate of depletion of liquid aerosol-forming substrate from the liquid storage portion. The stored reference temperature information may be associated with the stored depletion information in the lookup table.

The electric circuitry may be configured to compare measurements of temperature of the liquid aerosol-forming substrate held in the liquid storage portion from the temperature sensor with the stored reference temperature information in the lookup table. The electric circuitry may be configured to associate the measurements of temperature with the stored liquid aerosol-forming substrate depletion information. The electric circuitry may be configured to determine an estimate of depletion of liquid aerosol-forming substrate form the liquid storage portion based on the comparison.

The electric circuitry may be configured to determine a first estimate of depletion of liquid aerosol-forming substrate based on measurements of one or more quantities of the aerosol-generating system, such as measurements of the power supplied to the aerosol generator. The electric circuitry may be further configured to determine a second estimate of depletion based on the first determined estimate of depletion and measurements of the temperature of the liquid aerosol-forming substrate held in the liquid storage portion. This may improve the first determined estimate of depletion.

The depletion information stored in the lookup table may comprise a numerical value which may be used as a multiplier or a factor for adjusting the first estimate to compensate for variations in the temperature of the liquid aerosol-forming substrate held in the liquid storage portion. The electric circuitry may be configured to compare measurements of temperature of liquid aerosol-forming substrate held in the liquid storage portion with reference temperature information stored in the lookup table. The electric circuitry may be configured to associate the measurements of temperature of the liquid aerosol-forming substrate held in the liquid storage portion with the stored depletion information multipliers or factors based on the comparison. The electric circuitry may be configured to determine the second estimate of depletion based on the first estimate of depletion and the multiplier or factor stored in the lookup table associated with the reference temperature information matched with the measured temperature information. The electrical circuitry may be configured to determine the second estimate of depletion based on the product of the first estimate of depletion and the multiplier or factor associated with the measured liquid aerosol-forming substrate temperature information.

The reference temperature information stored in the lookup table and the depletion information stored in the lookup table may be determined in a calibration procedure. For example, the liquid storage portion may be filled with a known liquid aerosol-forming substrate, and a known regime may be performed to deplete the liquid aerosol-forming substrate from the liquid storage portion. The temperature of the liquid aerosol-forming substrate held in the liquid storage portion and the amount of liquid aerosol-forming substrate held in the liquid storage portion may be measured periodically and the depletion may be calculated. The calculated depletion may be stored in the lookup table and associated with reference temperature information corresponding to the measurements of temperature of the liquid aerosol-forming substrate held in the liquid storage portion. The calibration procedure may be performed before first use of the aerosol-generating system by an operator, for example, by the manufacturer at the factory.

The electrical circuitry may be configured to calculate the depletion based on measurements of the temperature of the liquid aerosol-forming substrate held in the liquid storage portion. It will be appreciated that the depletion may be a function of several variables, such as the dimensions and properties of the one or more capillary wicks and the fluid properties of the liquid aerosol-forming substrate The fluid properties of the liquid aerosol-forming substrate, such as the viscosity, may be dependent on the temperature of the liquid aerosol-forming substrate. The electrical circuitry may be configured to calculate an estimate of the depletion based on the dimensions and properties of the one or more capillary wicks, fluid properties of the liquid aerosol-forming substrate and measurements of the temperature of the liquid aerosol-forming substrate. Models for determining the temperature dependence of the viscosity of the liquid aerosol-forming substrate are known in the art and may be used to determine the viscosity of the liquid aerosol-forming substrate based on measurements of the temperature of the liquid aerosol-forming substrate. In addition, equations, such as Washburn's equation, may be used to determine the rate of depletion based on the dimensions and properties of the one or more capillary wicks and the determined viscosity of the liquid aerosol-forming substrate. The electrical circuitry may be configured to calculate depletion based on the relationship between one or more reference values determined in a calibration procedure and measurements of the temperature of the liquid aerosol-forming substrate.

The electric circuitry may be arranged to supply a desired (or, alternatively a predetermined) power to the aerosol generator. The aerosol generator may be activated on supply of the desired (or, alternatively a predetermined) power by the electric circuitry. The electric circuitry may be configured to monitor the power supplied to the aerosol generator. The electric circuitry may also be configured to determine the depletion of liquid aerosol-forming substrate based on the power supplied to the aerosol generator. In other words, the electric circuitry may be configured to determine the depletion of liquid aerosol-forming substrate based on measurements of the power supplied to the aerosol generator and the temperature of the liquid aerosol-forming substrate held in the liquid storage portion.

The aerosol generator may comprise an electric heater comprising one or more electric heating elements. The electric circuitry may be arranged to sense the temperature of the one or more electric heating elements. This configuration may be advantageous, as it does not require a second temperature sensor, which may take up valuable space in the aerosol generating system and may also be costly. The electrical resistance is used both as an 'actuator' (for the heating element) and a 'sensor' (temperature measurement).

The electric circuitry may be arranged to measure the electrical resistance of the one or more electric heating elements. The electric circuitry may be arranged to measure the electrical resistance of the one or more electric heating elements by measuring the current through the one or more electric heating elements and the voltage across the one or more electric heating elements. The electric circuitry may be configured to determine the electrical resistance of the at least one heating element from the measured current and voltage. The electric circuitry may comprise a resistor, having a known resistance, in series with the at least one heating element and the electric circuitry may be arranged to measure the current through the at least one heating element by measuring the voltage across the known-resistance resistor and determining the current through the at least one heating element from the measured voltage and the known resistance.

The electric circuitry may be configured to monitor activation of the electric heater by monitoring the resistance of the one or more heating elements over time. The electric circuitry may be configured to determine the depletion of liquid aerosol-forming substrate based on the measurements of resistance of the one or more electric heating elements and the temperature of the liquid aerosol-forming substrate held in the liquid storage portion.

The electric circuitry may be configured to ascertain the temperature of the one or more electric heating elements from the measurements of electrical resistance. If the one or more heating elements have suitable characteristics, such as a suitable temperature coefficient of resistance, the temperature of the one or more heating elements may be ascertained from measurements of the electrical resistance of the one or more heating elements. The electric circuitry may be configured to determine the depletion of liquid aerosol-forming substrate based on the ascertained temperature of the one or more heating elements and the temperature of the liquid aerosol-forming substrate held in the liquid storage portion.

The electrically operated aerosol-generating system may comprise two temperatures sensors, a first temperature sensor 270 and a second temperature sensor 271. The first temperature sensor may be the temperature sensor arranged in the liquid storage portion for sensing the temperature of liquid aerosol-forming substrate held in the liquid storage portion. The second temperature sensor may being arranged to sense the temperature of the one or more electric heating elements.

The electric circuitry may be configured to monitor activation of the electric heater by monitoring a temperature of the one or more heating elements, as sensed by the second temperature sensor, over time. The electric circuitry may be configured to determine the depletion of liquid aerosol-forming substrate based on measurements of the temperature of the one or more electric heating elements. The electric circuitry may be configured to determine the depletion of liquid aerosol-forming substrate based on the temperature of the liquid aerosol-generating substrate held in the liquid storage portion and the temperature of the one or more electric heating elements.

The electric circuitry may be arranged to determine depletion of liquid aerosol-forming substrate heated by the heater by monitoring an increase in the sensed or ascertained temperature over successive heating cycles as the liquid aerosol-forming substrate in the liquid storage portion is depleted. The electric circuitry may be configured to determine depletion of liquid aerosol-forming substrate heated by the heater by monitoring the rate of increase of the sensed or ascertained temperature of the one or more heating elements over a portion of each heating cycle, over successive heating cycles as the liquid aerosol-forming substrate in the liquid storage portion is depleted. The electric circuitry may be arranged to determine depletion of liquid aerosol-forming substrate heated by the heater by monitoring an increase in the value of an integral over time of the sensed or ascertained temperature of the one or more heating elements over a portion of each heating cycle, over successive heating cycles as the liquid aerosol-forming substrate in the liquid storage portion is depleted.

The electric circuitry may be configured to limit the temperature of the heating element to a maximum temperature. The electric circuitry may be configured to determine depletion of aerosol-forming substrate heated by the heater by monitoring an amount of power applied to the heating element to maintain the maximum temperature.

The electric circuitry may be configured to determine the depletion of liquid aerosol-forming substrate based on the temperature of the liquid aerosol-forming substrate held in the liquid storage portion and a relationship between the power supplied to the one or more electric heating elements and a resistance or temperature change of the one or more electric heating elements.

If the amount of liquid aerosol-forming substrate has decreased below a threshold amount, for example if the liquid storage portion is empty or nearly empty, insufficient liquid aerosol-forming substrate may be supplied to the heater. This may result in the temperature of the heating element increasing. The temperature of the heating element, as sensed by the temperature sensor, or the resistance of the one or more electric heating elements may enable the electric circuitry to determine that the amount of liquid aerosol-forming substrate held in the liquid storage portion has decreased to a desired (or, alternatively a predetermined) threshold.

The electric circuitry may be configured to determine an amount of liquid aerosol-forming substrate in the liquid storage portion. The determined amount of liquid aerosol-forming substrate held in the liquid storage portion may be an absolute amount or a relative amount, e.g. a percentage value, or may be a determination that there is more or less than a threshold amount of liquid aerosol-forming substrate in the liquid storage portion.

The electric circuitry may be configured to determine an estimate of the amount of liquid aerosol-forming substrate remaining in the liquid storage portion based on the determined depletion of liquid aerosol-forming substrate. The electric circuitry may be configured to determine an estimate of the amount of liquid aerosol-forming substrate held in the liquid storage portion by determining the depletion of liquid aerosol-forming substrate and subtracting the depleted amount from a known initial amount to provide the estimate of liquid aerosol-forming substrate remaining in the liquid storage portion.

The electric circuitry may comprise a sensor for detecting the presence of a liquid storage portion. The sensor may be configured to distinguish one liquid storage portion from another liquid storage portion and hence ascertain how much liquid aerosol-forming substrate is contained in the liquid storage portion when full. The sensor may also be configured to determine the composition of the liquid in the liquid storage portion. The sensor may be configured to determine the composition of the liquid in the liquid storage portion based on indicia on the liquid storage portion or the shape or size of the liquid storage portion. In use, the electric circuitry may be configured to determine the depletion of liquid aerosol-forming substrate based on the temperature of the liquid aerosol-forming substrate held in the liquid storage portion, the composition of the liquid aerosol-forming substrate, and the monitored activation of the aerosol generator.

The aerosol-generating system may comprise indicator(s) for indicating determined depletion information. For example, the aerosol-generating system may comprise visual indicator(s), such as a display or an array of LEDs. For example, the aerosol generator may comprise audible indicator(s), such as a buzzer or a loudspeaker. The electric circuitry may be configured to indicate the determined depletion information. For example, the electric circuitry may be configured to display determined depletion information on a display.

The electric circuitry may comprise a tilt sensor. The tilt sensor may comprise an accelerometer. The tilt sensor may be configured to sense the orientation of the liquid storage portion. The electric circuitry may be configured to receive sensed orientation information from the tilt sensor and to determine the orientation of the liquid storage portion.

The aerosol-generating system may comprise electric circuitry configured to control activation of the aerosol generator. The aerosol-generating system may comprise electric circuitry configured to supply power to the aerosol generator. The electrical circuitry configured to supply power to the aerosol generator may be the electrical circuitry configured to determine the depletion of liquid aerosol-forming substrate held in the liquid storage portion.

The electric circuitry may comprise a sensor or a puff detector to detect air flow indicative a puff being taken. The electric circuitry may be arranged to provide an electric current pulse to the aerosol generator at a desired (or, alternatively a predetermined) power when the sensor senses the taking of a puff. The time-period of the electric current pulse may be pre-set, depending on the amount of liquid desired to be atomised. The electric circuitry may be programmable for this purpose. The electric circuitry may be configured to monitor the total time of the time-periods of the electric current pulses to the aerosol generator. The electric circuitry may also be configured to estimate when the amount of liquid aerosol-forming substrate held in the liquid storage portion will be depleted.

The liquid storage portion may be any suitable shape and size. For example, the liquid storage portion may be substantially cylindrical. The cross-section of the liquid storage portion may, for example, be substantially circular, elliptical, square or rectangular.

The liquid storage portion may comprise a housing. The housing may comprise a base and one or more sidewalls extending from the base. The base and the one or more sidewalls may be integrally formed. The base and one or more sidewalls may be distinct elements that are attached or secured to each other. The housing may be a rigid housing. As used herein, the term 'rigid housing' is used to mean a housing that is self-supporting. The rigid housing of the liquid storage portion may provide mechanical support to the aerosol generator. The liquid storage portion may comprise one or more flexible walls. The flexible walls may be configured to adapt to the volume of the liquid aerosol-forming substrate held in the liquid storage portion. The housing of the liquid storage portion may comprise any suitable material. The liquid storage portion may comprise substantially fluid impermeable material. The housing of the liquid storage portion may comprise a transparent or a translucent portion, such that liquid aerosol-forming substrate held in the liquid storage portion may be visible through the housing.

The liquid storage portion may be substantially sealed. The liquid storage portion may comprise one or more outlets for liquid aerosol-forming substrate held in the liquid storage portion to flow from the liquid storage portion to the aerosol generator. The liquid storage portion may comprise one or more semi-open inlets. This may enable ambient air to enter the liquid storage portion. The one or more semi-open inlets may be semi-permeable membranes or one way valves, permeable to allow ambient air into the liquid storage portion and impermeable to substantially prevent air and liquid inside the liquid storage portion from leaving the liquid storage portion. The one or more semi-open inlets may enable air to pass into the liquid storage portion under specific conditions.

The liquid aerosol-forming substrate held in the liquid storage portion may be protected from ambient air. In some embodiments, ambient light may not be able to enter the liquid storage portion, so that the risk of degradation of the liquid is avoided. This may also enable a high level of hygiene to be maintained. If the liquid storage portion is not refillable, the liquid storage portion may have to be replaced when the liquid aerosol-forming substrate held in the liquid storage portion has been used up or has decreased to a desired (or, alternatively a predetermined) threshold. During such replacement, it may be desirable to prevent contamination from the liquid aerosol-forming substrate. If the liquid storage portion is refillable, the liquid storage portion may be refilled when the amount of liquid aerosol-forming substrate held in the liquid storage portion has decreased to a desired (or, alternatively a predetermined) threshold. The liquid storage portion may be arranged to hold sufficient liquid aerosol-forming substrate for a pre-determined number of puffs or heating cycles.

One or more capillary wicks are arranged to transfer liquid aerosol-forming substrate from the liquid storage portion to the aerosol generator. The one or more capillary wicks may comprise a capillary material. A capillary material is a material that actively conveys liquid from one end of the material to another.

The structure of the capillary material may comprise a plurality of small bores or tubes, through which the liquid can be transported by capillary action. The capillary material may have a fibrous structure. The capillary material may have a spongy structure. The capillary material may comprise a bundle of capillaries. The capillary material may comprise a plurality of fibres. The capillary material may comprise a plurality of threads. The capillary material may comprise fine bore tubes. The fibres, threads or fine-bore tubes may be generally aligned to convey liquid to the aerosol generator. The capillary material may comprise a combination of fibres, threads and fine-bore tubes. The capillary material may comprise sponge-like material. The capillary material may comprise foam-like material.

The capillary material may comprise any suitable material or combination of materials. Examples of suitable materials are a sponge or foam material, ceramic- or graphite-based materials in the form of fibres or sintered powders, foamed metal or plastics materials, a fibrous material, for example made of spun or extruded fibres, such as cellulose acetate, polyester, or bonded polyolefin, polyethylene, terylene or polypropylene fibres, nylon fibres or ceramic. The capillary material may have any suitable capillarity and porosity so as to be used with different liquid physical properties. The liquid aerosol-forming substrate has physical properties, including but not limited to viscosity, surface tension, density, thermal conductivity, boiling point and atom pressure, which allow the liquid to be transported through the capillary material by capillary action.

The one or more capillary wicks may be arranged to contact liquid held in the liquid storage portion. The one or more capillary wicks may extend into the liquid storage portion. In this case, in use, liquid may be transferred from the liquid storage portion to the aerosol generator by capillary action in the one or more capillary wicks. The one or more capillary wicks may have a first end and a second end. The first end may extend into the liquid storage portion to draw liquid aerosol-forming substrate held in the liquid storage portion into the aerosol-generator. The second end may extend into an air passage of the aerosol-generating system. The second end may comprise one or more aerosol-generating elements of the aerosol generator. The first end and the second end may extend into the liquid storage portion. One or more aerosol-generating elements of the aerosol generator may be arranged at a central portion of the wick between the first and second ends. In use, when the one or more aerosol-generating elements are activated, the liquid aerosol-forming substrate in the one or more capillary wicks is atomised at and around the one or more aerosol-generating elements.

The liquid aerosol-forming substrate may have physical properties, including viscosity, which allow the liquid to be transported through the one or more capillary wicks by capillary action.

The aerosol generator is arranged to receive liquid aerosol-forming substrate from the liquid storage portion via the one or more capillary wicks. The aerosol generator may be an atomiser. The aerosol generator may comprise one or more aerosol-generating elements. The aerosol generator may be configured to atomise received liquid aerosol-forming substrate using heat. The aerosol generator may comprise heater for atomising received liquid aerosol-forming substrate. The one or more aerosol-generating elements may be heating elements. The aerosol generator may be configured to atomise received liquid aerosol-forming substrate using ultrasonic vibrations. The aerosol generator may comprise an ultrasonic transducer. The one or more aerosol-generating elements may comprise one or more vibratable elements.

The aerosol generator may comprise heater configured to heat the aerosol-forming substrate. The heater may comprise one or more heating elements. The one or more heating elements may be arranged appropriately so as to most effectively heat received aerosol-forming substrate. The one or more heating elements may be arranged to heat the aerosol-forming substrate primarily by means of conduction. The one or more heating elements may be arranged substantially in directly contact with the aerosol-forming substrate. The one or more heating elements may be arranged to transfer heat to the aerosol-forming substrate via one or more heat conductive elements. The one or more heating elements may be arranged to transfer heat to ambient air drawn through the aerosol-generating system during use, which may heat the aerosol-forming substrate by convection. The one or more heating elements may be arranged to heat the ambient air before it is drawn through the aerosol-forming substrate. The one or more heating elements may be arranged to heat the ambient air after it is drawn through the aerosol-forming substrate.

The heater may be an electric heater. The electric heater may comprise one or more electric heating elements. The electric heater may comprise a single heating element. The electric heater may comprise more than one heating element, for example two, or three, or four, or five, or six or more heating elements. The one or more electric heating elements may comprise an electrically resistive material. Suitable electrically resistive materials may include: semiconductors such as doped ceramics, electrically "conductive" ceramics (such as, for example, molybdenum disilicide), carbon, graphite, metals, metal alloys and composite materials made of a ceramic material and a metallic material.

The one or more electric heating elements may take any suitable form. For example, the one or more electric heating elements may take the form of one or more heating blades. The one or more electric heating elements may take the form of a casing or substrate having different electro-conductive portions, or one or more electrically resistive metallic tube.

The heater may comprise an inductive heater. An inductive heater is described in more detail below, in relation to the cartridge.

The aerosol generator may comprise one or more heating wires or filaments encircling a portion of one or more capillary wicks. The heating wire or filament may support the encircled portion of the one or more capillary wicks.

The aerosol generator may comprise one or more vibratable elements and one or more actuators arranged to excite vibrations in the one or more vibratable elements. The one or more vibratable elements may comprise a plurality of passages through which aerosol-forming substrate may pass and become atomised. The one or more actuators may comprise one or more piezoelectric transducers.

The liquid storage portion may hold a supply of liquid aerosol-forming substrate. The liquid storage portion may comprise liquid aerosol-forming substrate held in the liquid storage portion. As used herein, an aerosol-forming substrate is a substrate capable of releasing volatile compounds that can form an aerosol. Volatile compounds may be released by heating the aerosol-forming substrate. Volatile compounds may be released by moving the aerosol-forming substrate through passages of a vibratable element.

The aerosol-forming substrate may be liquid at room temperature. The liquid aerosol-forming substrate may comprise both liquid and solid elements. The liquid aerosol-forming substrate may comprise nicotine. The nicotine containing liquid aerosol-forming substrate may be a nicotine salt matrix. The liquid aerosol-forming substrate may comprise plant-based material. The liquid aerosol-forming substrate may comprise tobacco. The liquid aerosol-forming substrate may comprise a tobacco-containing material containing volatile tobacco flavour compounds, which are released from the aerosol-forming substrate upon heating. The liquid aerosol-forming substrate may comprise homogenised tobacco material. The liquid aerosol-forming substrate may comprise a non-tobacco-containing material. The liquid aerosol-forming substrate may comprise homogenised plant-based material.

The liquid aerosol-forming substrate may comprise at least one aerosol-former. An aerosol-former is any suitable known compound or mixture of compounds that, in use, facilitates formation of a dense and stable aerosol and that is substantially resistant to thermal degradation at the temperature of operation of the system. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Aerosol formers may be polyhydric alcohols or mixtures thereof, such as triethylene glycol, 1,3-butanediol and glycerine. The liquid aerosol-forming substrate may comprise other additives and ingredients, such as flavourants.

The liquid aerosol-forming substrate may comprise water, solvents, ethanol, plant extracts and natural or artificial flavours. The liquid aerosol-forming substrate may comprise nicotine and at least one aerosol former. The aerosol former may be glycerine. The aerosol-former may be propylene glycol. The aerosol former may comprise both glycerine and propylene glycol. The liquid aerosol-forming substrate may have a nicotine concentration of between about 0.5% and about 10%.

A carrier material may be arranged in the liquid storage portion for holding the liquid aerosol-forming substrate. The carrier material may be made from any suitable absorbent body of material, for example, a foamed metal or plastics material, polypropylene, terylene, nylon fibres or ceramic. The liquid aerosol-forming substrate may be retained in the carrier material prior to use of the aerosol-generating system. The liquid aerosol-forming substrate may be released into the carrier material during use. The liquid aerosol-forming substrate may be released into the carrier material immediately prior to use. For example, the liquid aerosol-forming substrate may be provided in a capsule. The shell of the capsule may melt upon heating by the heater and releases the liquid aerosol-forming substrate into the carrier material. The capsule may contain a solid in combination with the liquid.

The aerosol-generating system may comprise one or more electric power supplies. The power supply may be a battery. The battery may be a Lithium based battery, for example a Lithium-Cobalt, a Lithium-Iron-Phosphate, a Lithium Titanate or a Lithium-Polymer battery. The battery may be a Nickel-metal hydride battery or a Nickel cadmium battery. The power supply may be another form of charge storage device such as a capacitor. The power supply may require recharging and be configured for many cycles of charge and discharge. The power supply may have a capacity that allows for the storage of enough energy for one or more experiences; for example, the power supply may have sufficient capacity to allow for the continuous generation of aerosol for a period of around six minutes, corresponding to the typical time taken to smoke a conventional cigarette, or for a period that is a multiple of six minutes. In another example, the power supply may have sufficient capacity to allow for a desired (or, alternatively a predetermined) number of puffs or discrete activations of the heater and actuator.

The aerosol-generating system may comprise an input, such as a switch or button. This enables the operator to turn the system on. The switch or button may activate the aerosol generator. The switch or button may initiate aerosol generation. The switch or button may prepare the control electronics to await input from the puff detector.

The aerosol-generating system may comprise a housing. The housing may be elongate. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. The material may be light and non-brittle.

The housing may comprise a cavity for receiving the power supply. The housing may comprise a mouthpiece. The mouthpiece may comprise at least one air inlet and at least one air outlet. The mouthpiece may comprise more than one air inlet. One or more of the air inlets may reduce the temperature of the aerosol before it is delivered and may reduce the concentration of the aerosol before it is delivered.

The aerosol-generating system may be portable. The aerosol-generating system may have a size comparable to a conventional cigar or cigarette. The aerosol-generating system may have a total length between about 30 mm and about 150 mm. The aerosol-generating system may have an external diameter between about 5 mm and about 30 mm.

The aerosol-generating system may comprise a mouthpiece portion. The mouthpiece portion may be configured to allow a puff or draw on the mouthpiece portion to draw air through the atomising element past the aerosol generator.

The aerosol-generating system may have a housing. The housing may comprise a connecting portion for connection with a main unit comprising a power supply and control electronics (e.g., including the electric circuitry). The connecting portion may comprise a screw fitting, a push fitting or a bayonet fitting for example.

The aerosol-generating system may comprise a main unit and a cartridge. The main unit comprises the control system. The cartridge comprises the liquid storage portion for holding the liquid aerosol-forming substrate. The main unit may be configured to removably receive the cartridge. The temperature sensor may be arranged to sense the temperature of the liquid aerosol-forming substrate held in the liquid storage portion when the cartridge is received by the main unit.

The main unit may comprise one or more power supplies. The main unit may comprise the aerosol generator.

The cartridge may comprise the aerosol generator. Where the cartridge comprises the aerosol generator, the cartridge may be referred to as a 'cartomiser'.

The aerosol-generating system may comprise an aerosol-generating element comprising the aerosol generator. The aerosol-generating element may be separate of the main unit and the cartridge. The aerosol-generating element may be removably receivable by at least one of the main unit and the cartridge.

The main unit may comprise the temperature sensor. The cartridge may comprise the temperature sensor.

The aerosol generator may comprise heater substantially as described above in relation to a previous embodiment. The heater may be an inductive heater, such that no electrical contacts are formed between the cartridge and the main unit. The main unit may comprise an inductor coil and a power supply configured to provide high frequency oscillating current to the inductor coil. The cartridge may comprise a susceptor element positioned to heat the aerosol-forming substrate. As used herein, a high frequency oscillating current means an oscillating current having a frequency of between 10 kHz and 20 MHz.

The cartridge may be removably coupled to the main unit. The cartridge may be removed from the main unit when the aerosol-forming substrate has been consumed. The cartridge may be disposable. However, the cartridge may be reusable and the cartridge may be refillable with liquid aerosol-forming substrate. The cartridge may be replaceable in the main unit. The main unit may be reusable.

The cartridge may be manufactured at low cost, in a reliable and repeatable fashion. As used herein, the term 'removably coupled' is used to mean that the cartridge and the main unit can be coupled and uncoupled from one another without significantly damaging either the main unit or the cartridge.

The cartridge may have a simple design. The cartridge may have a housing within which a liquid aerosol-forming substrate is held. The cartridge housing may be a rigid housing. The housing may comprise a material that is impermeable to liquid.

The main unit may have a housing. The housing may comprise a connecting portion for connection with the atomising element. The main unit housing may have a connecting portion corresponding to the connecting portion of the housing of the atomising element. The connecting portion may comprise a screw fitting, a push fitting or a bayonet fitting for example.

The cartridge may comprise a lid. The lid may be peelable before coupling the cartridge to the main unit. The lid may be piercable.

The main unit may comprise a cavity for receiving the cartridge. The main unit may comprise a cavity for receiving the power supply.

The main unit may comprise the aerosol generator. The main unit may comprise one or more control systems of the aerosol-generating system. The main unit may comprise the power supply. The power supply may be removably coupled to the main unit.

The main unit may comprise the mouthpiece. The mouthpiece may comprise at least one air inlet and at least one air outlet. The mouthpiece may comprise more than one air inlet.

The main unit may comprise a piercing element for piercing the lid of the cartridge. The mouthpiece may comprise the piercing element. The mouthpiece may comprise at least one first conduit extending between the at least one air inlet and a distal end of the piercing element. The mouthpiece may comprise at least one second conduit extending between a distal end of the piercing element and the at least one air outlet. The mouthpiece may be arranged such that in use, when the mouthpiece is drawn upon, air flows along an air passage extending from the at least one air inlet, through the at least one first conduit, through a portion of the cartridge, through the at least one second conduit and exits the at least one outlet. This may improve airflow through the main unit and enable the aerosol to be delivered more easily.

In use, a cartridge may be inserted as described herein into the cavity of a main unit as described herein. The mouthpiece may be attached to the body of the main unit, which may pierce the cartridge with the piercing portion. The main unit may be activated by pressing the switch or the button. Drawing on the mouthpiece draws air into the main unit through the one or more air inlets. The air may pass over a puff detector of the electrical circuitry and the electric or electrical circuitry may detect the airflow and activate the aerosol generator. The air may pass over a portion of the activated aerosol generator, entraining atomised aerosol-forming substrate, and exit the main unit through the air outlet in the mouthpiece. On activation of the aerosol generator, the electrical circuitry may measure the temperature of the liquid aerosol-forming substrate held in the liquid storage portion using the temperature sensor. The electrical circuitry may also determine the depletion of liquid aerosol-forming substrate from the liquid storage portion based on the temperature measurements. The electric circuitry may also display the consumption on a display of the main unit, to indicate the depletion of liquid aerosol-forming substrate.

A kit of parts may be provided, comprising a cartridge and a main unit, substantially as described above. An aerosol-generating system according to one embodiment may be provided by assembling the cartridge and the main unit. The elements of the kit of parts may be removably connected. The elements of the kit of parts may be interchangeable. Elements of the kit of parts may be disposable. Elements of the kit of parts may be reusable.

In one embodiment, there is provided a main unit for an electrically operated aerosol-generating system according to a previous embodiment. The main unit comprises the electrical circuitry and the temperature sensor. The temperature sensor is arranged to sense the temperature of liquid aerosol-forming substrate held in the liquid storage portion when the cartridge is removably coupled to the main unit. The main unit may further comprise the aerosol generator.

In another embodiment, there is provided a cartridge for an electrically operated aerosol-generating system according to a previous embodiment. The cartridge comprises the liquid storage portion and the temperature sensor. The cartridge may further comprise the aerosol generator.

A method of determining the depletion of liquid aerosol-forming substrate from a liquid storage portion of an aerosol-generating system may comprise: holding a liquid aerosol-forming substrate in a liquid storage portion of an aerosol-generating system; arranging a temperature sensor to sense the temperature of the liquid aerosol-forming substrate held in the liquid storage portion; measuring the temperature of the liquid aerosol-forming substrate held in the liquid storage portion; and determining the depletion of liquid aerosol-forming substrate based on the temperature of the liquid aerosol-forming substrate.

The method may further comprise: determining a first estimate of depletion of liquid aerosol-forming substrate based on one or more of: the power supplied to the aerosol generator, the resistance or temperature of the one or more electric heating elements, and a relationship between the power supplied to the one or more electric heating elements and a resulting resistance or temperature change of the one or more electric heating elements. The method may further comprise: determining a second estimate of depletion of liquid aerosol-forming substrate held in the liquid storage portion based on the first determined estimate of depletion and the temperature of the liquid aerosol-forming substrate held in the liquid storage portion as sensed by the temperature sensor.

FIG. 1 is a schematic illustration of an electrically operated aerosol-generating system 100. The system 100 comprises a main unit 101 and a cartridge 200. The main unit 101 comprises a battery 110 and electric or electrical circuitry 120. The cartridge 200 comprises a liquid storage portion 210 and aerosol generator 220. Since the cartridge 200 comprises the aerosol generator 220, the cartridge 200 may be referred to as a 'cartomiser'.

The liquid storage portion 210 is substantially circularly cylindrical and is configured to hold a liquid aerosol-forming substrate 230 in a carrier material. An airflow passage 240 passes through the centre of the liquid storage portion 210 such that the liquid storage portion 210 forms an annular, circularly cylindrical volume. A capillary wick 250 extends across the airflow passage 240, between opposite sides of the liquid storage portion 210. The capillary wick 250 comprises a capillary material that is arranged to draw liquid aerosol-forming substrate along the capillary wick 250 from either end. In an embodiment, the temperature sensor 270 and the aerosol generator 220 may be arranged opposite to each other, where each is on one of opposite ends of the liquid storage portion 210 (where location 220a may be another location for the aerosol generator 220, in line with this embodiment).

As shown in FIG. 1, the aerosol generator 220 comprises an electrically powered heater in the form of a heater filament that is coiled around a central section of the capillary wick 250 within the airflow passage 240. The heater is electrically connected to the battery 110 of the main unit 101 via the electrical circuitry 120. Power is provided from the battery 120 in main unit 101 to the heater 220 in the cartridge 200, under the control of the electrical circuitry 130. The capillary wick 250 delivers liquid aerosol-forming substrate 230 from the liquid storage portion 210 to the aerosol generator 220.

The cartridge 200 also comprises a mouthpiece 260 arranged at an end of the airflow passage 240. The mouthpiece 260 comprises an air outlet (not shown) to draw air through the airflow passage 240.

A temperature sensor 270 is arranged in the liquid storage portion 210 of the cartridge 200. The temperature sensor 270 is arranged at the proximal end of the liquid storage portion 210, opposite the mouthpiece end, which is the furthest position in the liquid storage portion 210 away from the aerosol generator. The temperature sensor 270 is electrically connected to the electric circuitry 120 of the main unit 101 via complimentary contacts (not shown) in the cartridge 200 and the main unit 101.

FIG. 2 is a schematic illustration of a second embodiment of an electrically operated aerosol-generating system 300. The system 300 comprises a main unit 301 and a cartridge 400. The main unit 301 comprises a battery 310 and electric or electrical circuitry 320. The cartridge 400 comprises a liquid storage portion 410 and aerosol generator 420. Since the cartridge 400 comprises the aerosol generator 420, the cartridge 400 may be referred to as a 'cartomiser'.

The liquid storage portion 410 is substantially circularly cylindrical and is configured to hold a liquid aerosol-forming substrate 430 in a carrier material. An airflow passage 440 passes through the centre of the liquid storage portion 410 such that the liquid storage portion 410 forms an annular, circularly cylindrical volume. A capillary wick 450 extends across the airflow passage 440, between opposite sides of the liquid storage portion 410. The capillary wick 450 comprises a capillary material that is arranged to draw liquid aerosol-forming substrate along the capillary wick 450 from either end. In an embodiment, the temperature sensor 330 and the aerosol generator 420 may be arranged opposite to each other, where each is on one of opposite ends of the liquid storage portion 410 (where location 420a may be another location for the aerosol generator 420, in line with this embodiment).

As shown in FIG. 2, the aerosol generator 420 comprises an electrically powered heater in the form of a heater filament that is coiled around a central section of the capillary wick 450 within the airflow passage 440. The heater is electrically connected to the battery 310 of the main unit 301 via the electrical circuitry 320. Power is provided from the battery 310 in main unit 301 to the heater 420 in the cartridge 400, under the control of the electrical circuitry 320. The capillary wick 450 delivers liquid aerosol-forming substrate 430 from the liquid storage portion 410 to the aerosol generator 420.

The cartridge 400 also comprises a mouthpiece 460 arranged at an end of the airflow passage 440. The mouthpiece 460 comprises an air outlet (not shown) to draw air through the airflow passage 440.

Although it is illustrated only schematically, the connection between the main unit 301 and the cartridge 400 is made by a screw connection. The main unit 301 comprises a substantially circularly cylindrical projection at the distal end, having a male screw thread (not shown) around the outer circumference. The cartridge 400 comprises a recess at the proximal end, having a female screw thread (not shown) around the inner circumference. The recess and female screw thread of the cartridge 400 are complimentary to the projection and male screw thread of the main unit 301, such that the projection and male screw thread of the main unit 301 may be received in the recess and female screw thread of the main unit 301.

A temperature sensor 330 is arranged in the projection at the distal end of the main unit 301. The temperature sensor 330 is arranged to abut with the liquid storage portion 410 when the cartridge 400 is received by the main unit 301. This configuration arranges the temperature sensor 330 close to the liquid storage portion, such that the temperature sensor 330 may sense the temperature of the liquid aerosol-forming substrate 430 held in the liquid storage portion 410.

The systems 100, 300 illustrated in FIGS. 1 and 2 operate as follows. When the mouthpiece 260, 460 of the cartridge 200, 400 is drawn upon, air is drawn into the airflow passage 230, 430 through inlet holes (not shown) in the housing of the main unit 101, 301 and the cartridge 200, 400. An airflow sensor, such as a microphone (not shown), is provided in the electrical circuitry 120, 320 and senses the flow of air induced by drawing on the mouthpiece 260, 460. When a sufficient airflow is detected, the electrical circuitry 120, 320 supplies power to the aerosol generator 220, 420 from the battery 110, 310. This activate the heater, causing the heater filament to heat up and vapourise liquid aerosol-forming substrate 230, 430 held in the central section of the capillary wick 250, 450 in the immediate vicinity of the heater filament. The resulting vapour is released in the airflow passage 240, 440 and is cooled in the air flowing through the passage, past the aerosol generator. The cooled vapour condenses to form an aerosol. The aerosol is drawn in the airflow flowing through the airflow passage 240, 440 to and through the mouthpiece 260, 460. When the mouthpiece is no longer drawn upon, and the airflow past the airflow sensor drops below a threshold level, the electrical circuitry 120, 320 stops providing power to the aerosol generator 220, 420. The capillary wick 250, 450 is replenished with liquid aerosol-forming substrate 230, 430 from the liquid storage portion 210, 410 by capillary action.

In use, the electric circuitry 120, 320 periodically measures the temperature of the liquid aerosol-forming substrate 230, 430 held in the liquid storage portion 210, 410 and determines the depletion of liquid aerosol-forming substrate based on the measurements of the temperature of the liquid aerosol-forming substrate.

In some embodiments, the electric circuitry 120, 320 comprises a memory (not shown) storing a lookup table. The lookup table comprises reference temperature information associated with depletion information. In these embodiments, the electric circuitry 120, 320 compares the measurements of temperature with the reference temperature information stored in the lookup table. On determining a match between a measurement of temperature and a reference temperature, the electric circuitry 120, 320 determines the depletion information associated with the matched reference temperature information in the lookup table. As such, the electric circuitry determines the depletion of liquid aerosol-forming substrate 230, 430 from the liquid storage portion 210, 410.

The main unit 101, 301 may also comprise a display (not shown). The electric circuitry may send the associated depletion information to the display to indicate the depletion of liquid aerosol-forming substrate 230, 430 from the liquid storage portion 210, 410.

In some embodiments, the electric circuitry 120, 320 is further configured to determine one or more of the amount of liquid aerosol-forming substrate 230, 430 remaining in the liquid storage portion 210, 410 and the time or number of puffs remaining based on the measurements of the temperature of the liquid aerosol-forming substrate 230, 430 held in the liquid storage portion 210, 410. The electric circuitry 120, 320 may also display on the display the determined amount of liquid aerosol-forming substrate 230, 430 remaining in the liquid storage portion 210, 410 and the time or number of puffs remaining.

In some embodiments, the electric circuitry is configured to measure other quantities of the aerosol-generating system.

For example, in one embodiment the electric circuitry is configured to measure the power supplied to the aerosol generator. The electric circuitry is configured to determine a first estimate of depletion of liquid aerosol-forming substrate based on the measurements of the power supplied to the aerosol generator. The depletion information stored in the lookup table and associated with the reference temperature information comprises a multiplier for adjusting the first estimate of depletion. As such, the electric circuitry multiplies the first estimate of depletion with the multiplier determined from measurements of the temperature of the liquid aerosol-forming substrate held in the liquid storage portion. The electric circuitry then determines a second estimate of depletion of liquid aerosol-forming substrate from the liquid storage portion based on the product of the first estimate of depletion and the multiplier. The electric circuitry may send the second estimate of depletion to the display to inform the depletion.

It will be appreciated that in some embodiments, the electric circuitry will be configured to calculate the depletion of liquid aerosol-forming substrate based on measurements of temperature of liquid aerosol-forming substrate held in the liquid storage portion without reference to depletion information stored in a lookup table.

It will be appreciated that the examples described herein are straightforward examples, and that modifications may be made to the illustrated circuits to provide different or more sophisticated functionality.

The invention claimed is:

1. An e-vaping element, comprising:
   a reservoir configured to hold a liquid aerosol-forming substrate;
   a heater configured to receive the liquid aerosol-forming substrate from the reservoir;
   one or more capillary wicks configured to transfer the liquid aerosol-forming substrate from the reservoir to the heater; and
   a first temperature sensor configured to sense at least one first temperature of the liquid aerosol-forming substrate held in the reservoir, the first temperature sensor and the heater being spaced apart from each other to minimize an increase in the at least one first temperature due to an activation of the heater.

2. The e-vaping element of claim 1, further comprising:
   electric circuitry operatively arranged to interface with the heater and the first temperature sensor, the electric circuitry being configured to monitor the at least one first temperature and determine depletion information of the liquid aerosol-forming substrate in the reservoir based on the at least one first temperature.

3. The e-vaping element of claim 2, wherein the electric circuitry is configured to determine the depletion information by determining an amount of the liquid aerosol-forming substrate depleted from the reservoir or a rate of depletion of the liquid aerosol-forming substrate from the reservoir.

4. The e-vaping element of claim 2, wherein
   the electric circuitry is operatively arranged to supply a desired power to the heater; and
   the electric circuitry is configured to monitor a power supplied to the heater and determine the depletion information based on the at least one first temperature and the power supplied to the heater.

5. The e-vaping element of claim 2, wherein the electric circuitry is arranged to measure a resistance of the heater.

6. The e-vaping element of claim 5, further comprising:
   a second temperature sensor, the second temperature sensor being configured to sense at least one second temperature of the heater.

7. The e-vaping element of claim 6, wherein the electric circuitry is configured to:
   monitor activation of the heater by monitoring the at least one second temperature or a resistance of the heater; and
   determine the depletion information based on the at least one first temperature and the resistance or the at least one second temperature.

8. The e-vaping element of claim 6, wherein the electric circuitry is configured to determine the depletion information based on the at least one first temperature and a relationship between a power supplied to the heater and a resistance change or the at least one second temperature.

9. The e-vaping element of claim 6, wherein the electric circuitry is further configured to determine the depletion information by
   determining a first estimate of depletion of the liquid aerosol-forming substrate based on one or more of,
   power supplied to the heater,
   the resistance or the at least one second temperature, and
   a relationship between the power supplied to the heater and a resistance change or a temperature change of the heater; and
   determining a second estimate of depletion of the liquid aerosol-forming substrate held in the reservoir based on the first estimate of depletion and the at least one first temperature.

10. The e-vaping element of claim 2, wherein the electric circuitry is configured to determine the depletion information by determining an estimate of an amount of the liquid aerosol-forming substrate remaining in the reservoir based on the determined depletion.

11. The e-vaping element of claim 10, wherein the electric circuitry is configured to determine the estimate of the amount of the liquid aerosol-forming substrate remaining in the reservoir by subtracting the determined depletion from a known initial amount of the liquid aerosol-forming substrate.

12. The e-vaping element of claim 2, wherein the electric circuitry includes at least one first processor, the at least one first processor being operationally connected to the heater and the first temperature sensor, the at least one first processor being configured to determine the depletion information.

13. The e-vaping element of claim 2, wherein the electric circuitry is further configured to determine the depletion information based on a series of measured temperatures from the first temperature sensor, the at least one first temperature including the series of measured temperatures.

14. The e-vaping element of claim 1, wherein the e-vaping element is a cartridge.

15. The e-vaping element of claim 1, wherein the first temperature sensor and the heater are a furthest distance away from each other within the reservoir.

16. The e-vaping element of claim 1, wherein the first temperature sensor and the heater are on opposites ends of a longitudinal length of the reservoir.

17. The e-vaping element of claim 1, wherein the reservoir has a longitudinal length, and the first temperature sensor and the heater are spaced apart along the longitudinal length.

18. A system, comprising:
- a cartridge, the cartridge being the e-vaping element of claim 1; and
- a main unit, the main unit including
  - a power supply, and
  - electric circuitry configured to monitor the at least one first temperature and determine depletion information of the liquid aerosol-forming substrate in the reservoir based on the at least one first temperature.

19. The system of claim 18, wherein the cartridge is configured to be removably received by the main unit.

20. The e-vaping element of claim 1, wherein the first temperature sensor and the heater are on opposite ends of the reservoir.

21. The e-vaping element of claim 1, wherein the first temperature sensor and the heater are spaced apart from each other to minimize the increase in the at least one first temperature due to the activation of the heater so as to sense an average temperature of the liquid aerosol-forming substrate in the reservoir.

* * * * *